US 6,704,775 B1

(12) United States Patent
Sato et al.

(10) Patent No.: US 6,704,775 B1
(45) Date of Patent: Mar. 9, 2004

(54) FACSIMILE IMAGE INFORMATION MANAGING SYSTEM AND METHOD

(75) Inventors: Kazutaka Sato, Tokyo (JP); Hiroyasu Tanabe, Tokyo (JP)

(73) Assignee: Cosat, Inc., Tokyo (JP)

( * ) Notice: Subject to any disclaimer, the term of this patent is extended or adjusted under 35 U.S.C. 154(b) by 0 days.

(21) Appl. No.: 09/469,112

(22) Filed: Dec. 21, 1999

(30) Foreign Application Priority Data

Dec. 25, 1998 (JP) .......................... 10-369682
Jan. 14, 1999 (JP) .......................... 11-008159
Jan. 25, 1999 (JP) .......................... 11-015203

(51) Int. Cl.$^7$ ............................ G06F 15/16
(52) U.S. Cl. .................. 709/219; 709/206; 358/407; 358/524; 379/100.08
(58) Field of Search ................ 709/219, 206; 358/524, 402, 407, 440; 379/100.08, 100.09

(56) References Cited

U.S. PATENT DOCUMENTS

| | | | | |
|---|---|---|---|---|
| 5,068,888 A | * | 11/1991 | Scherk et al. | 379/100.11 |
| 5,235,433 A | * | 8/1993 | Clarkson et al. | 358/434 |
| 5,237,430 A | * | 8/1993 | Sakurai | 358/444 |
| 5,530,740 A | * | 6/1996 | Irribarren et al. | 379/88.17 |
| 5,668,640 A | * | 9/1997 | Nozawa et al. | 358/434 |
| 5,881,233 A | * | 3/1999 | Toyoda et al. | 709/233 |
| 5,892,591 A | * | 4/1999 | Anglin et al. | 358/407 |
| 5,892,909 A | * | 4/1999 | Grasso et al. | 709/201 |
| 6,025,931 A | * | 2/2000 | Bloomfield | 358/402 |
| 6,067,570 A | * | 5/2000 | Kreynin et al. | 709/227 |
| 6,115,739 A | * | 9/2000 | Ogawa et al. | 709/215 |
| 6,128,101 A | * | 10/2000 | Saito | 358/402 |
| 6,134,017 A | * | 10/2000 | Schlank et al. | 358/1.15 |
| 6,208,426 B1 | * | 3/2001 | Saito et al. | 358/1.15 |
| 6,208,638 B1 | * | 3/2001 | Rieley et al. | 370/354 |
| 6,230,189 B1 | * | 5/2001 | Sato et al. | 709/206 |
| 6,233,318 B1 | * | 5/2001 | Picard et al. | 379/88.17 |
| 6,259,538 B1 | * | 7/2001 | Amit et al. | 358/442 |
| 6,288,799 B1 | * | 9/2001 | Sekiguchi | 358/468 |
| 6,307,641 B1 | * | 10/2001 | Hamano et al. | 358/1.15 |
| 6,333,973 B1 | * | 12/2001 | Smith et al. | 379/88.12 |
| 6,350,066 B1 | * | 2/2002 | Bobo, II | 709/206 |
| 6,384,927 B1 | * | 5/2002 | Mori | 358/1.15 |
| 6,421,708 B2 | * | 7/2002 | Bettis | 709/206 |
| 6,430,177 B1 | * | 8/2002 | Luzeski et al. | 370/356 |

OTHER PUBLICATIONS

"Interpage (TM) Network Services Inc. Service Update" for FaxUP WWW and InFax/OutFax; Nov. 22, 1995.*

RightFax, Inc. Web Pages, www.rightfax.com, May 30 and Sep. 2, 1997, as saved by the Wayback Machine, www.archive.org. Printed and viewed Aug. 27, 2002.*

* cited by examiner

*Primary Examiner*—Rupal Dharia
*Assistant Examiner*—Melvin Pollack
(74) *Attorney, Agent, or Firm*—Rader, Fishman & Grauer PLLC

(57) ABSTRACT

A server of a facsimile information managing system receives facsimile image information, stores it, generates index information, which refers to its storage location, transmits it, accepts a request for specifying the storage location, and transmits facsimile image information stored in the specified storage location, a relay relays index information, the request for specifying the storage location of the facsimile image and facsimile image information, a client accepts an input for selecting the storage location of facsimile image information from the index information, transmits the request for specifying the selected storage location to the server, receives facsimile image information transmitted by the server, and displays it. An HTML format is used in index information, a GIF format is used in facsimile image information, and a WWW browser is used in processing of client.

11 Claims, 14 Drawing Sheets

FIG. 10

```
<html>
<title>FAX IMAGE INDEX</title>
<body>
<table>
<tr>
        <td>December 25, 1998 12:34</td>
        <td>NOBNOB CO., LTD.</td>
        <td>0120-123-4567</td>
        <td><a href="19981225/fax01.gif"><img src="19981225/thm01.gif"></a></td>
</tr>
<tr>
        <td>December 25, 1998 13:02</td>
        <td>COSAT CORP.</td>
        <td>02-5804-1234</td>
        <td><a href="19981225/fax02.gif"><img src="19981225/thm02.gif"></a></td>
</tr>
<tr>
        <td>December 25, 1998 15:41</td>
        <td>AKPAT & CO.</td>
        <td>02-5280-1234</td>
        <td><a href="19981225/fax03.gif"><img src="19981225/thm03.gif"></a></td>
</td>
<tr>
        <td>December 25, 1998 20:11</td>
        <td>NOBNOB CO., LTD.</td>
        <td>0120-123-4567</td>
        <td><a href="19981225/fax04.gif"><img src="19981225/thm04.gif"></a></td>
</tr>
</table>
</body>
</html>
```

FACSIMILE IMAGE INFORMATION MANAGING SYSTEM AND METHOD

BACKGROUND OF THE INVENTION

1. Field of the Invention

The present invention relates to a facsimile image information managing system and method. Particularly, the present invention relates to a facsimile image information managing system wherein a client computer can select desired facsimile image information from those received by a server computer, display it, and print it.

2. Description of the Related Art

Facsimile apparatuses, which receive facsimile image information through telephone lines and print it on paper, have come into widespread use.

Also, there has been proposed a computer typed facsimile apparatus, which receives facsimile image information through the telephone line by a modem, stores it in a memory of the computer and a hard disk displays facsimile image information on a monitor display, and prints it by a printer.

On the other hand, the technique of computer communication net works such as LAN (Local Area Network) where mutual communications ban e performed between computers and between the computer and the printer, WAN (Wide Area Network), Internet, etc has increasingly become widespread.

The conventional facsimile apparatus prints received facsimile image information on paper immediately. This prevents facsimile image information from being reused electronically. Also, since even unnecessary facsimile image information is printed on paper without fail, it is difficult to save paper sources.

In the conventional computer type facsimile apparatus, the user browses received facsimile image information and selects it, so that only necessary facsimile image information can be printed. However, even when the computer is connected to the computer communication network, such computer typed facsimile apparatus can not be operated from the other computers.

Particularly, there has been greatly increased the desire to easily perform the management of the computer, which has received facsimile image information and stored it. Namely, received and stored facsimile information is displayed by browsers such as Netscape Navigator (tradenark of Netscape Communications Corporation), Internet Explore (trademark of Microsoft Corporation), selected, and printed by use of WWW (World Wide Wave), which is one of Internet technique, and information of an HTML (Hyper Text Markup Language) format.

SUMMARY OF THE INVENTION

The present invention has been made to solve the aforementioned problems, and an object of the present invention is to provide a technique which allows a user to select desired one of received facsimile image information, display it, and print it.

According to a first aspect of the present invention, there is provided a facsimile image information managing system comprising:

(a) a server which receives facsimile image information, for storing the received facsimile image information, generates index information, which refers to a storage location of the stored facsimile image information, for transmitting the generated index information, accepts a request for specifying the storage location of facsimile image information, and transmits the facsimile image information stored at the storage location specified in accordance with the accepted request;

(b) a relay which relays the index information transmitted by the server, the request for specifying the storage location of the facsimile image accepted by the server, and the facsimile image information; and (c) a client which receives the index information, which has been transmitted by the server and relayed by the relay, displays the received index information, accepts an input for selecting the storage location of the facsimile image information from the displayed index information, causes the relay to relay the request for specifying the storage location of the facsimile image information selected by the accepted input so as to be transmitted to the server, for receiving the facsimile image information, which has been transmitted by the server and relayed by the relay, and displays the received facsimile image information.

The client may further comprise a printer in which when the client accepts an input for selecting facsimile image information to be printed from the displayed facsimile image information, and transmits the facsimile image information selected by the accepted input, the printer receives the facsimile image information transmitted by the client and prints the received facsimile image information.

Also, in the facsimile image information managing system, the facsimile image information transmitted by the client may be relayed by the relay and received by the printer.

The index information may include information of sender that has sent the facsimile image information. In this case, the client may display the information of sender and accepts the input for selecting the storage location of facsimile image information.

The server may generate index image information, which shows the index of stored facsimile image information, and cause the relay to relay the index image information, and transmit it. In this case, the client receives the index image information relayed by the relay, displays it, and accepts the input for selecting the storage location of the facsimile image information.

Furthermore, the facsimile image information managing system may further comprise a scanner which scans facsimile image information wherein the server accepts an input for selecting a transmission destination to which facsimile image information scanned by the scanner is transmitted, the server transmits the scanned facsimile image information to the transmission destination selected by the accepted input.

Also, in the case the facsimile image information managing system comprises the scanner, the client may accept an input for selecting a transmission destination to which facsimile image information scanned by the scanner is transmitted, and transmit the facsimile image information to the server after the transmission destination is relayed by the relay, the server receives the transmission destination relayed by the relay and transmits the facsimile image information scanned by the scanner to the transmission destination.

The index information is in, for example, an HTML format and the facsimile image information is in, for example, a JPEG format, a TIFF format and a GIF format.

A facsimile image information managing server apparatus of the second aspect of the present invention comprises:

(a) an image information receiver which receives facsimile image information;
(b) a nonvolatile storage which stores the facsimile image information received by said image information receiver;
(c) an index information generator which generates index information which refers to a storage location of said facsimile image information stored by said nonvolatile storage;
(d) a request receiver which receives a request from a client apparatus connected through a computer communication network;
(e) a response transmitter which transmits a response to the client apparatus connected through the computer communication network;
(f) an index information transmission controller which controls said response transmitter to transmit a response, which includes index information generated by said index information generator, to said client apparatus when said request receiver receives a request for obtaining index information from the client apparatus connected through the computer communication network; and
(g) a facsimile image information transmission controller which controls said response transmitter to transmit a response, which includes facsimile image information stored at a location specified by said nonvolatile storage, to said client apparatus when said request receiver receives a request for obtaining said facsimile information from the client, apparatus connected through the computer communication network after specifying the location where said facsimile image information is stored.

The facsimile image information managing server apparatus may further comprises:
(h) an index information sorter which sorts index information which refers to the storage location of the facsimile image information, and generates index information when said request receiver receives a request for sorting index information from the client apparatus connected through the computer communication network; and
(i) a sorted index information transmission controller which controls said response transmitter to transmit index information sorted and generated by said index information sorter.

Said nonvolatile storage may store, for example, a sender's telephone number of the facsimile image information received by said image information receiver, lime when said facsimile image information is received by said image information receiver, and sender information corresponding to said telephone number, and said index information sorter uses any one of sender's telephone number of facsimile image information stored in said nonvolatile storage, time when facsimile image information is received, sender information of facsimile image information or the combination thereof as a key, and sorts index information to be generated.

An information recording medium storing a program of the third aspect of the present invention controls a server to perform:
(a) an image information receiving step of receiving facsimile image information;
(b) a nonvolatile storing step of storing the facsimile image information, which has been received by said image information receiving step, in a nonvolatile manner;
(c) an index information generating step of generating index information, which refers to a storage location of the facsimile image information stored by said nonvolatile storing step, when a request for obtaining index information from a client apparatus connected through a computer communication network is received;
(d) an index information transmitting step of transmitting a response, which includes index information generated by said index information generating step, to said client apparatus; and
(e) a facsimile image information transmitting step of transmitting a response, which includes facsimile image information stored at a location specified by said nonvolatile storing step, to said client apparatus when a request for obtaining said facsimile information from the client apparatus connected through the computer communication network is received by said request receiving step after specifying the location where said facsimile image information is stored.

The program may be embodied in a carrierwave and may be transmitted.

A method for managing facsimile image information according to the fourth aspect o(f the present invention, comprises:
(a) an image information receiving step of receiving facsimile image information;
(b) a nonvolatile storing step of storing the facsimile image information, which has been received by said image information receiving step in a nonvolatile manner;
(c) an index information generating step of generating index information, which refers to a storage location of the facsimile image information stored by said nonvolatile storing step, when a request for obtaining index information from a client apparatus connected through a computer communication network is received;
(d) an index information transmitting step of transmitting a response, which includes index information generated by said index information generating step, to said client apparatus; and
(e) a facsimile image information transmitting step of transmitting a response, which includes facsimile image information stored at a location specified by said nonvolatile storing step, to said client apparatus when a request for obtaining said facsimile information from the client apparatus connected through the computer communication network is received by said request receiving step after specifying the location where said facsimile image information is stored.

A client for processing facsimile image according to the fifth aspect of the present invention comprises:
(a) n index information receiver for receiving index information, which includes information of a location where a server apparatus stores facsimile image information, from said server apparatus connected through a computer communication network;
(b) an index information display for displaying index information received by said index information receiver;
(c) a location information selection input acceptor for accepting an input for selecting information of the location where facsimile image information is stored from the index information displayed by said index information receiver;
(d) facsimile image information obtaining means for obtaining facsimile image information from said server apparatus based on the information of the location where facsimile image information, which has been accepted by said location information selection input acceptor, is stored; and (e) a facsimile information display for displaying facsimile image information obtained by said facsimile image information obtaining means.

The client may further comprises:

(f) a sort instruction input acceptor which accepts an instruction input to the effect that index information displayed by said index information display should be sorted; and (g) a sorted index information display which sorts index information displayed by said index information display and displays said sorted index information when said sort instruction input acceptor accepts the instruction input to the effect that index information should be sorted.

An information recording medium of the sixth aspect of the present invention stores a program for controlling a client to perform:

(a) an index information receiving step of receiving index information, which includes information of a location where a server apparatus stores facsimile image information, from said server apparatus connected through a computer communication network;

(b) an index information displaying step of displaying index information received by said index information receiving step;

(c) a location information selection input accepting step of accepting an input for selecting information of the location where facsimile image information is stored from the index information displayed by said index information receiving step;

(d) a facsimile image information obtaining step of obtaining facsimile image information from said server apparatus based on information of the location where facsimile image information accepted by said location information selection input accepting step is stored; and (e) a facsimile information display step of displaying facsimile image information obtained by said facsimile image information obtaining step.

An information recording medium of the seventh aspect of the present invention stores a program for controlling a client to perform:

(a) an index information receiving step of receiving index information, which includes a location where facsimile image information, from a server apparatus connected through a computer communication network;

(b) an index information displaying step of displaying index information received by said index information receiving step;

(c) a location information selection input accepting step of accepting an input for selecting information of the location where facsimile image information is stored from the index information displayed by said index information receiving step;

(d) a facsimile image information obtaining step of obtaining facsimile image information from said server apparatus based on information of the location where facsimile image information accepted by said location information selection input accepting step is stored; and (e) a facsimile information display step of displaying facsimile image information obtained by said facsimile image information obtaining step.

The program may be embodied in a carrierwave and may be transmitted.

A facsimile image information display method of the eighth aspect of the present invention comprises:

(a) an index information receiving step of receiving index information, which includes information of a location where a server apparatus stores facsimile image information, from said server apparatus connected through a computer communication network;

(b) an index information displaying step of displaying index information received by said index information receiving step;

(c) a location information selection input accepting step of accepting an input for selecting information of the location where facsimile image information is stored from the index information displayed by said index information receiving step;

(d) a facsimile image information obtaining step of obtaining facsimile image information from said server apparatus based on information of the location where facsimile image information accepted by said location information selection input accepting step is stored; and (e) a facsimile information display step of displaying facsimile image information obtained by said facsimile image information obtaining step.

A facsimile image information display method of the nineth aspect of the present invention comprises:

(a) an index information receiving step of receiving index information, which includes a location where facsimile image information, from a server apparatus connected through a computer communication network;

(b) an index information display step of displaying index information received by said index information receiving step;

(c) a location information selection input accepting step of accepting an input for selecting information of the location where facsimile image information is stored from the index information displayed by said index information receiving step;

(d) a facsimile image information obtaining step of obtaining facsimile image information from said server apparatus based on information of the location where facsimile image information accepted by said location information selection input accepting step is stored; and (e) a facsimile information display step of displaying facsimile image information obtained by said facsimile image information obtaining step.

BRIEF DESCRIPTION OF THE DRAWINGS

These objects and other objects and advantages of the present invention will become more apparent upon reading of the following detailed description and the accompanying drawings in which:

FIG. 10 is a diagram exemplifying HTML script for displaying sorted index information.

DETAILED DESCRIPTION OF THE PREFERRED EMBODIMENTS

The following will explain the embodiments of the present invention with reference to the accompanying drawings. The following embodiments are those for explaining the present invention, and do not limit the scope of the present invention. Therefore, the embodiments in which the respective elements or all elements are replaced with equivalents for these elements can be easily adopted by one skilled in the art, and these embodiments are included in the scope of the present invention.

First Embodiment

Figure 1:
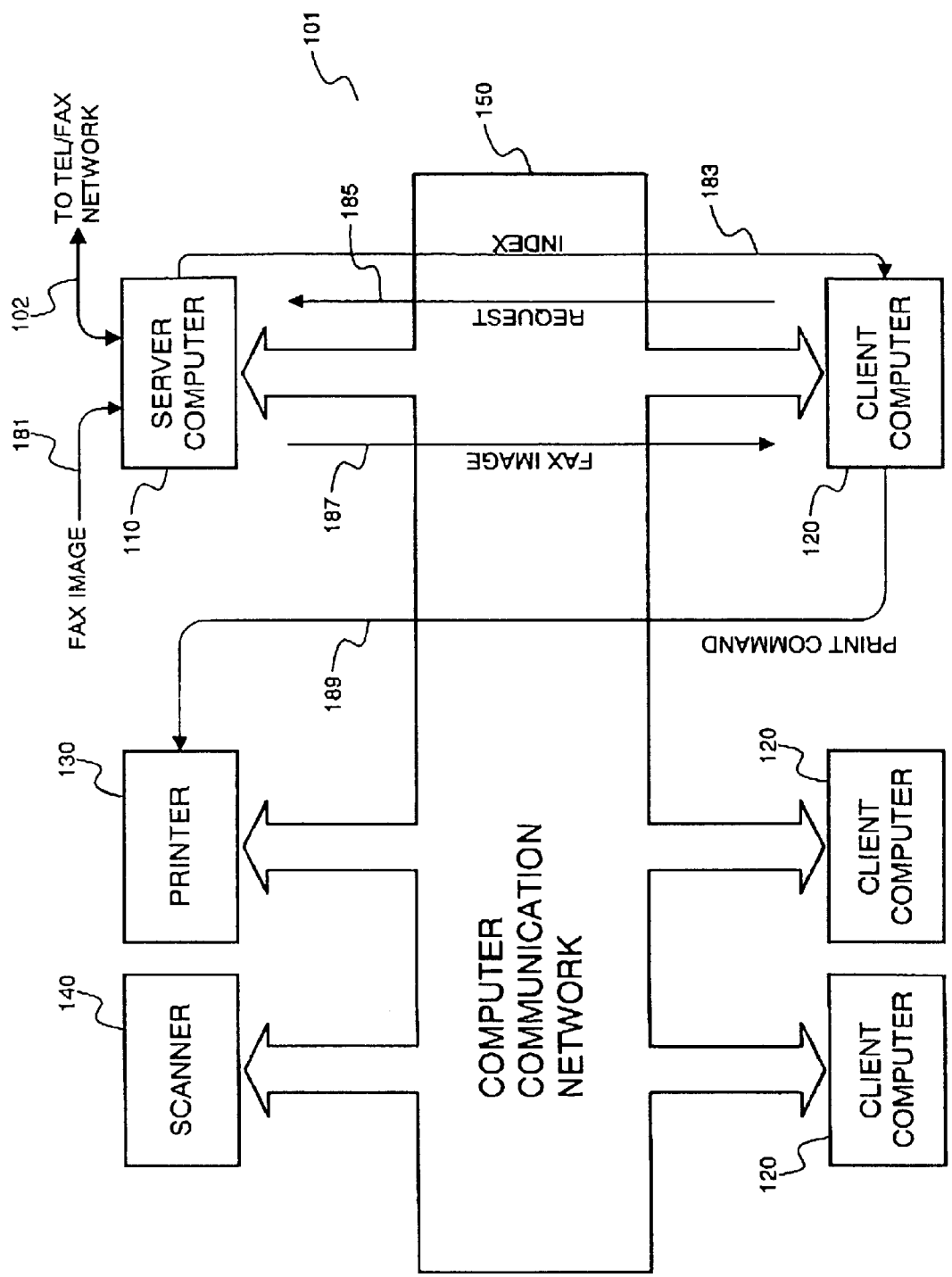
FIG. 1 is an explanatory view schematically showing the facsimile information managing system according to a first embodiment of the present invention.

FIG. 1 is an explanatory view showing the facsimile information managing system of the first embodiment of the present invention.

A facsimile information managing system 101 comprises a server computer 110 connected to a telephone line 102, a plurality of client computers 120, a printer 130, a scanner 140, and a computer communication network 150, which performs communications therebetween. The server computer 110 receives facsimile image information in response to a call from the telephone line 102, and stores it. Moreover, the server computer 110 generates index information 183 based on the stored information, and transmits it to the client computer 120. The client computer 120 receives the index information 183, displays it, and instructs a user to select this index information 183. Thereafter, the client computer 120 transmits a request 185, which specifies selected facsimile image information, to the server computer 110.

The server computer 110 receives this request 185, and transmits facsimile image information 187, which is specified from facsimile image information stored, to the client computer 120.

Moreover, the client computer 120 transmits a print command 189 for printing index information and facsimile image information to the printer 130 in accordance with the request from the user. Upon reception of the print command 189, the printer 130 prints information Computer communication network 150 relays these reception and transmission.

Figure 2:
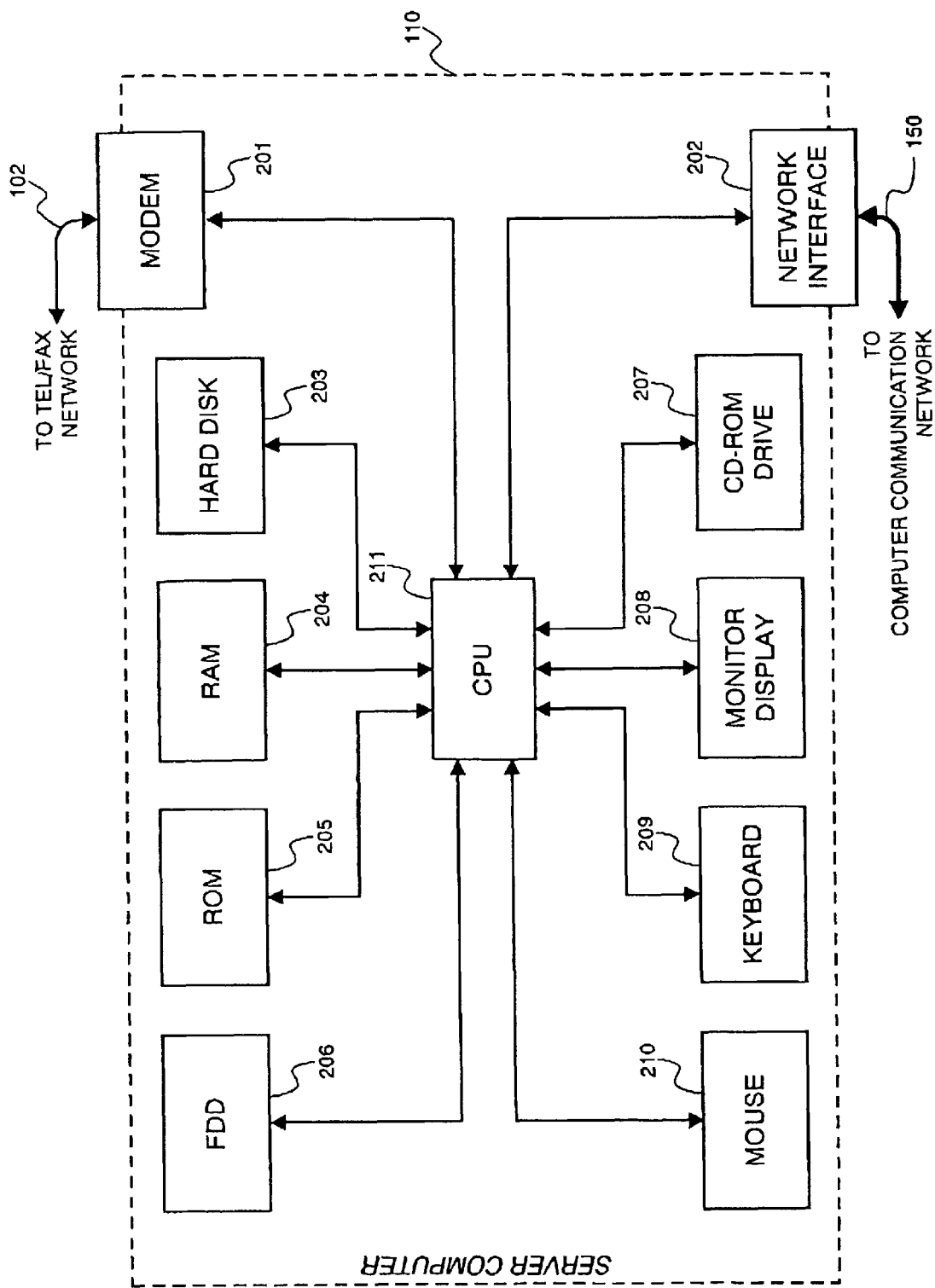
FIG. 2 is an explanatory view schematically showing a server computer of the facsimile information managing system according to the first embodiment of the present invention.

FIG. 2 is an explanatory view schematically showing the server computer 110 of the facsimile information managing system 101 according to the first embodiment of the present invention. The server computer 110 comprises a modem 201 for performing reception and transmission of facsimile image information between the telephone and the server computer 110, a network interface 202 for performing reception and transmission of information among the network interface 202, the printer 130, and the scanner 140 through the computer communication network 150, a hard disk 203 for storing received facsimile image information, index image information generated therefrom, and index text information, a RAM (Random Access Memory) 204 for storing temporary work information, a ROM (Read Only Memory) 205 for storing IPL (Initial Program Loader), etc., an FDD (Floppy Disk Drive) 206, which is operated by the server computer 110, for reading a program to he installed on the hard disk 203, a CD-ROM (Compact Disc Read Only Memory) drive 207, a monitor display 208 for displaying various information, a keyboard 209 for receiving inputs of various information, a mouse 210, and a CPU 211 for controlling these units.

Figure 3:
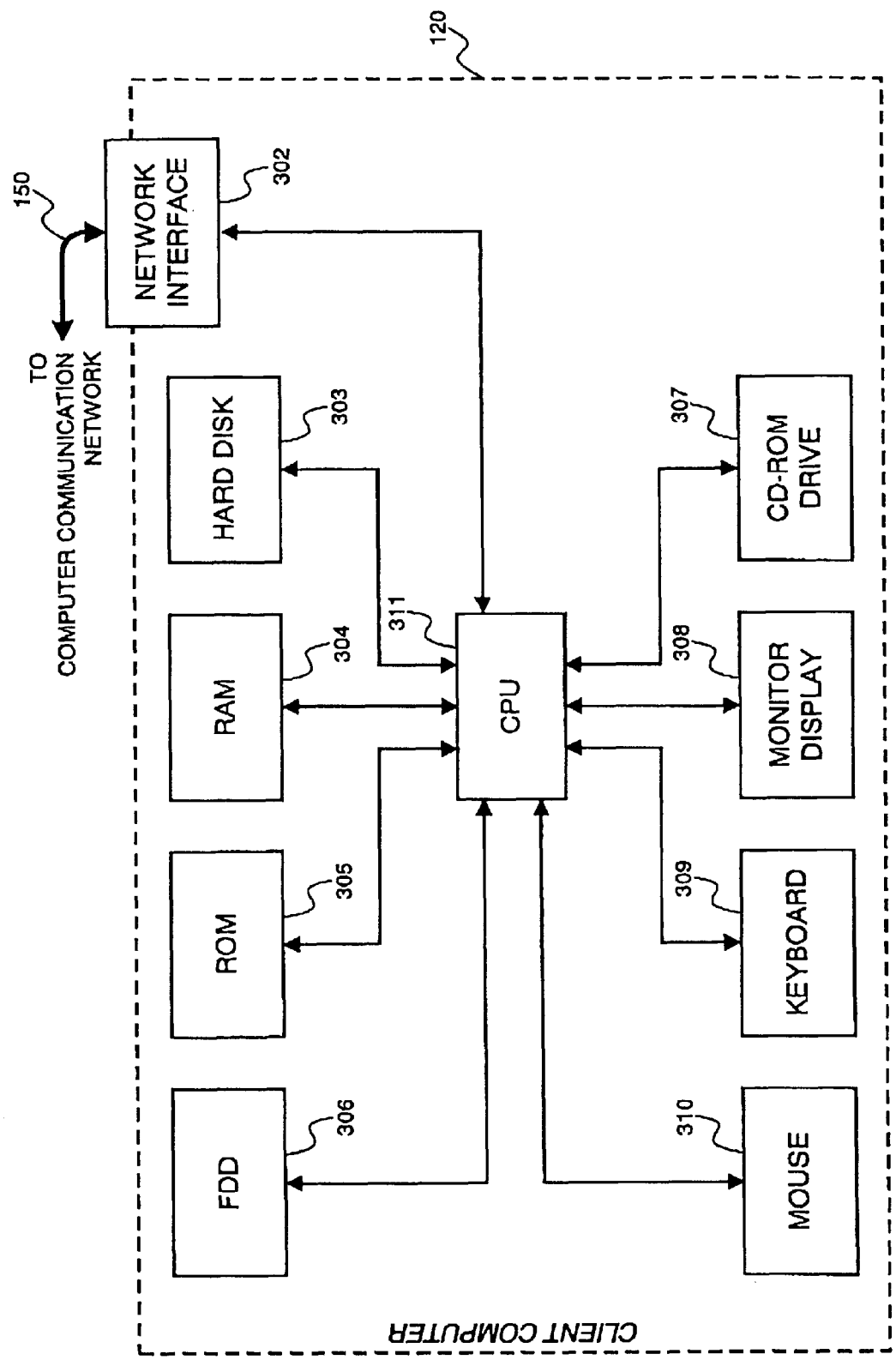
FIG. 3 is an explanatory view schematically showing a client server computer of the facsimile information managing system according to the first embodiment of the present invention.

FIG. 3 is an explanatory view schematically showing the client computer 120 or the facsimile information managing system 101 according to the first embodiment of the present invention.

The client computer 120 comprises a network interface 302 for performing reception and transmission of information among the server computer 110, the printer 130, and the scanner 140 through the computer communication network 150, ahard disk 303 for storing a program for controlling the client computer 120, a RAM (Random Access Memory) 304 for storing temporary work information, a ROM (Read Only Memory) 305 for storing IPL (Initial Program Loader), etc., an FDD (Floppy Disk Drive) 306, which is operated by the client computer 120, for reading a program to be installed on the hard disk 303, a CD-ROM (Compact Disc Read Only Memory) drive 307, a monitor display 308 for displaying various information, a keyboard 309 for receiving inputs of various information, a mouse 310, and a CPU 311 for controlling these units.

As the client computer 120, a low-price terminal such as a so-called NC (Network Computer), a game apparatus having an Internet connectable function, a cellular phone, etc., can be easily adopted by one skilled in art, and this embodiment is included in the scope of the present invention.

Also, such an embodiment that the modem is used as the network interface 302 of the client computer 120 and is connected to the computer communication network 150 on dialup, particularly an embodiment in which this dialup connection is achieved through the modem 201 of the server computer 110 and the server computer 110 functions as a dialup server can be easily adopted by one skilled in the art, and this embodiment is also included in the scope of the present invention.

The computer communication network 150 can use, for example, TCP/TP (Transmission Control Protocol/Internet protocol) and/or NctBEUI (Net BIOS Extended User Interface) as communication protocol.

The explanatory view of FIG. 1 shows the plurality of client computers 120, and one of them carries out communications with the server computer 110 and the printer 130. Also, the same processing can he executed by the other client computers 120. Therefore, for example, as compared with (he conventional method in which a plurality of employees uses a common facsimile apparatus to conduct negotiations with an outside company, each employee has only to operate the client computer put on the desk, thereby making it possible to browse arrived facsimile image information and print it.

Moreover, the number of client computer 120 may be one, this embodiment is included in the scope of the present invention. In such a case, the server for facsimile image information can be configured by low-cost computer and modem and this contributes to a reduction in cost of office equipment.

Furthermore, in this embodiment, the printer 130 and scanner 140 are connected to the server computer 110 and the client computer 120. However, an embodiment in which they are directly connected to the server computer and the client computer can be easily adopted by one skilled in the art, and this embodiment is also included in the scope of the present invention.

Figure 4A:
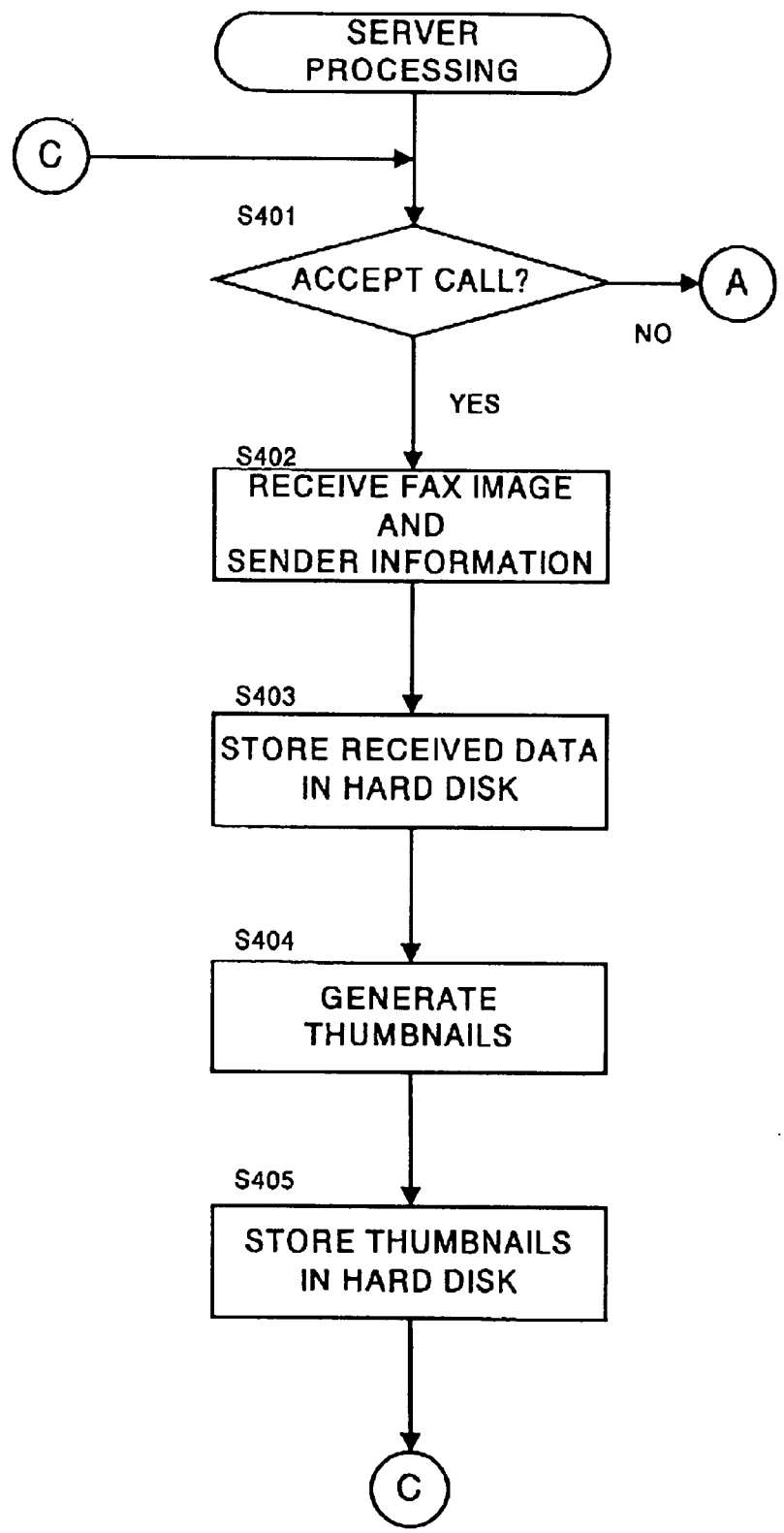
FIGS. 4A to 4C are flowcharts showing a procedure of server processing to be executed by the server computer according to the first embodiment of the present invention.
Figure 4B:
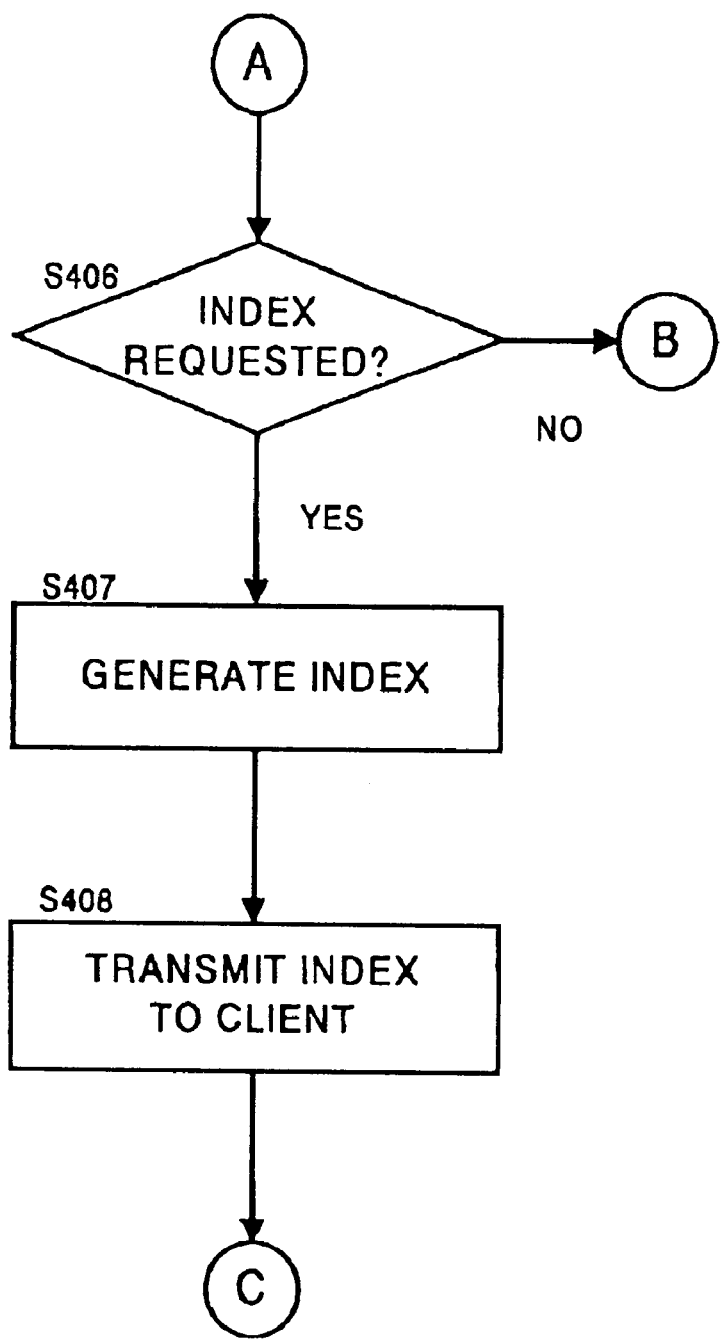
Figure 4C:
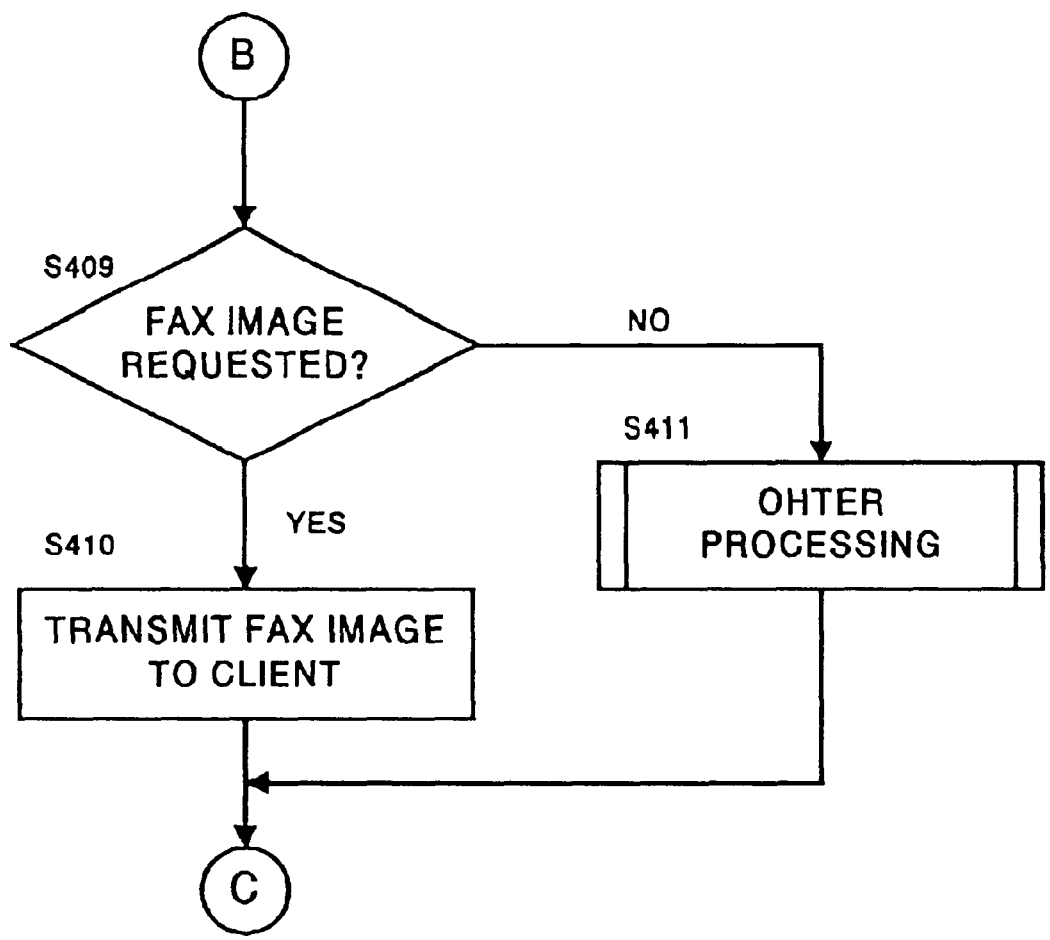

FIGS. 4A to 4C are flowcharts showing a procedure of server processing to be executed by the server computer 110.

The server computer 110 according to the first embodiment of the present invention determines whether or not a call to the effect that facsimile image information is sent from the telephone line 102 is accepted through the modem 201 (step S401). If the call is accepted (Yes in step S401), that is, a telephone for a facsimile transmission to the telephone number of modem 201 occurs, the server computer 110 receives a sender's telephone (facsimile) number of facsimile information and the facsimile image information (step S402), and stores the facsimile information in the hard disk 203 in associated with the sender's telephone number (step S403).

In addition to these information, it is possible to store time when facsimile image information has, been received, a sender's name, a title name in the hard disk 203.

Moreover, a so-called thumbnail image is generated from facsimile image information (step S404), and this thumbnail image is stored in the hard disk 203 as index image information (step S405), and the operation goes back to step S401.

If these facsimile image information and index image information are stored in, for example, a JPEG, TIFF, or GIF format, it is possible to easily browse these information at the client computer 120.

While, if the call is not accepted from the telephone line (No in step S401), the server computer 110 determines whether or not the client computer 120 requests index information through the computer communication network 150 (step S406). If the client computer 120 requests index information (Yes in step S406), the server computer 110 generates index text information of, for example, an ITML (or XML) format, which includes sender information (sender's telephone number) stored in the hard disk 203, a storage location of index image information associated therewith, and a storage location of facsimile image information associated therewith.

The HTML format is one of information formats to browse information stored in the sever computer 110 at the client computer 120.

For example, it is assumed that the sender's telephone number is 0120-123-4567, the storage location (file name) of index image information associated therewith is thm01.gif, and the storage location (file name) of facsimile image information is fax01.gif. The following tags of HTML format can be included in index information <a href="fax01.gif>0120-123-4567<img src="thm01.gif"></a>

Generally, since information received so far are stored in the hard disk 203, a plural sets of "sender information, storage location of index image information, storage location of facsimile image information" is present, and a plurality of tags is named in index information.

Also, if information of time when facsimile image information has been received, the sender's name, the title name are stored in the hard disk 203, they are included in the tags of the HTML format together, thereby making it possible to provide various information to the user of the client computer 120 and to improve convenience.

Next, the server computer 110 transmits the generated index text information written in HTML to the client computer 120 (step S408), and the operation goes back to step S401.

While, if the client computer 120 does not request index information (No in step S406), the server computer 10 determines whether or not the client computer 120 requests facsimile image information (step S409). Then, if the client computer 120 requests facsimile image information (Yes in step S409), the server computer 10 transmits the facsimile image information to the client computer 120 (step S410), and the operation goes back to step S401.

In the client computer 120, as described later, the sender's telephone number (sender information) and the thumbnail images (index image information) in which the facsimile image transmitted therefrom is reduced are displayed on the monitor display 308 based on the above-mentioned tagged HTML script The user operates the keyboard 309 and the mouse 310, and clicks the displayed telephone number or the thumbnail image so as to select necessary facsimile image information After that, the client computer 120 requests the facsimile image information of the server computer 1.0.

If the client computer 120 does request facsimile image information (No in step S409), the server computer 110 executes the other processing (step S411), and the operation goes back to step 401.

The other processing in step S4 11 includes one in which sort of transmitting index transmit index information. It is possible to execute processing for sorting index information in order as the user wishes, that is, in order of arrival time, that of telephone number, that of sender's name and title, etc.

These operations are controlled by the CPU 211, and this control program is installed on the hard disk 203 through the FD drive 206, CD-ROM drive 207, or the computer communication network 150 from FD or DC-ROM. For example, the control program is implemented by CGI (Common Gateway Interface) script.

Also, one skilled in the art can easily adopt an embodiment in which processing for receiving facsimile image information from the telephone line so as to store various information to the hard disk (steps S401 to S405), processing for generating index information in response to the request from the client so as to be transmitted (step S406 to S408), processing for transmitting facsimile image information (step S409 to S410), and other processing (step S411) are executed by time division processing in parallel and independently, unlike the above-explained embodiment. This embodiment is also included in the scope of the present invention.

Figure 5A:
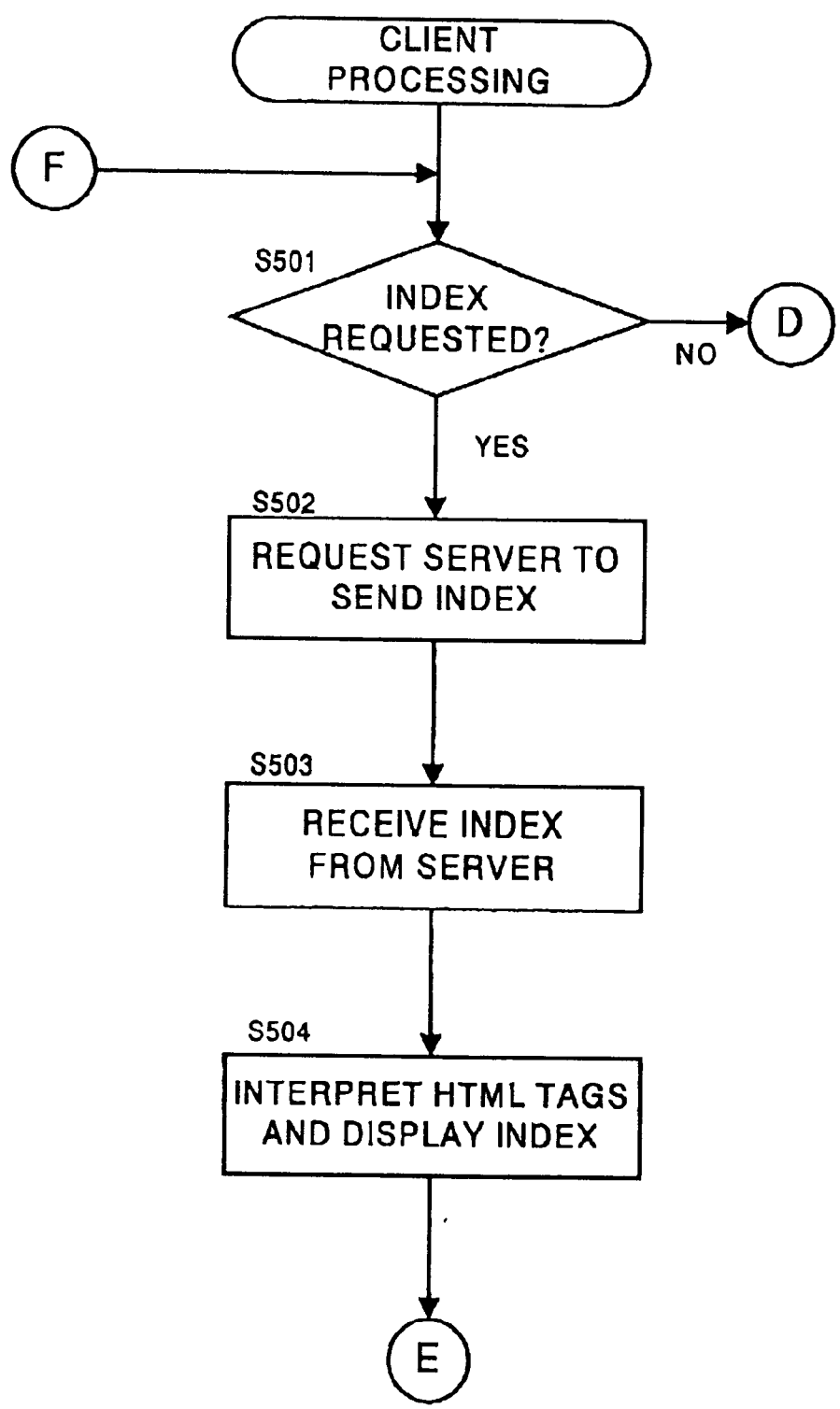
FIGS. 5A to 5C are flowcharts showing a procedure of client processing to be executed by the client computer according to the first embodiment of the present invention.
Figure 5B:
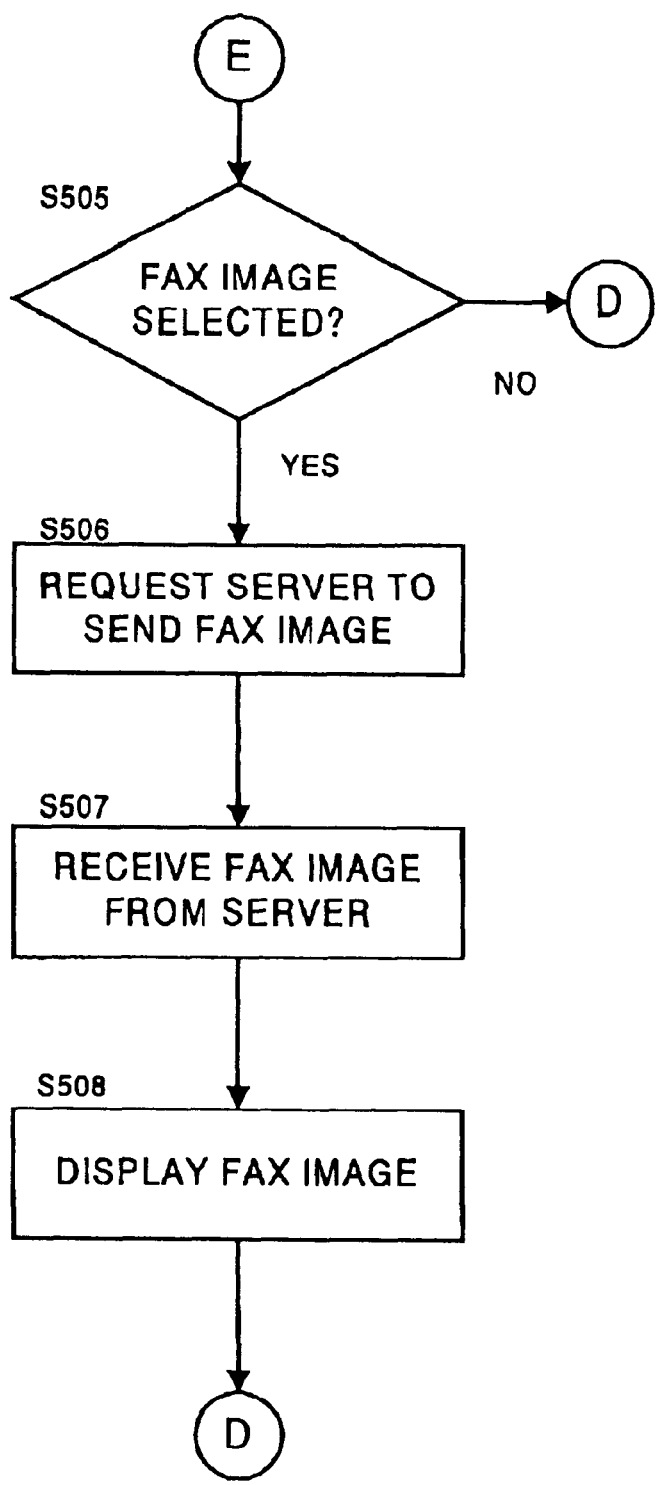
Figure 5C:
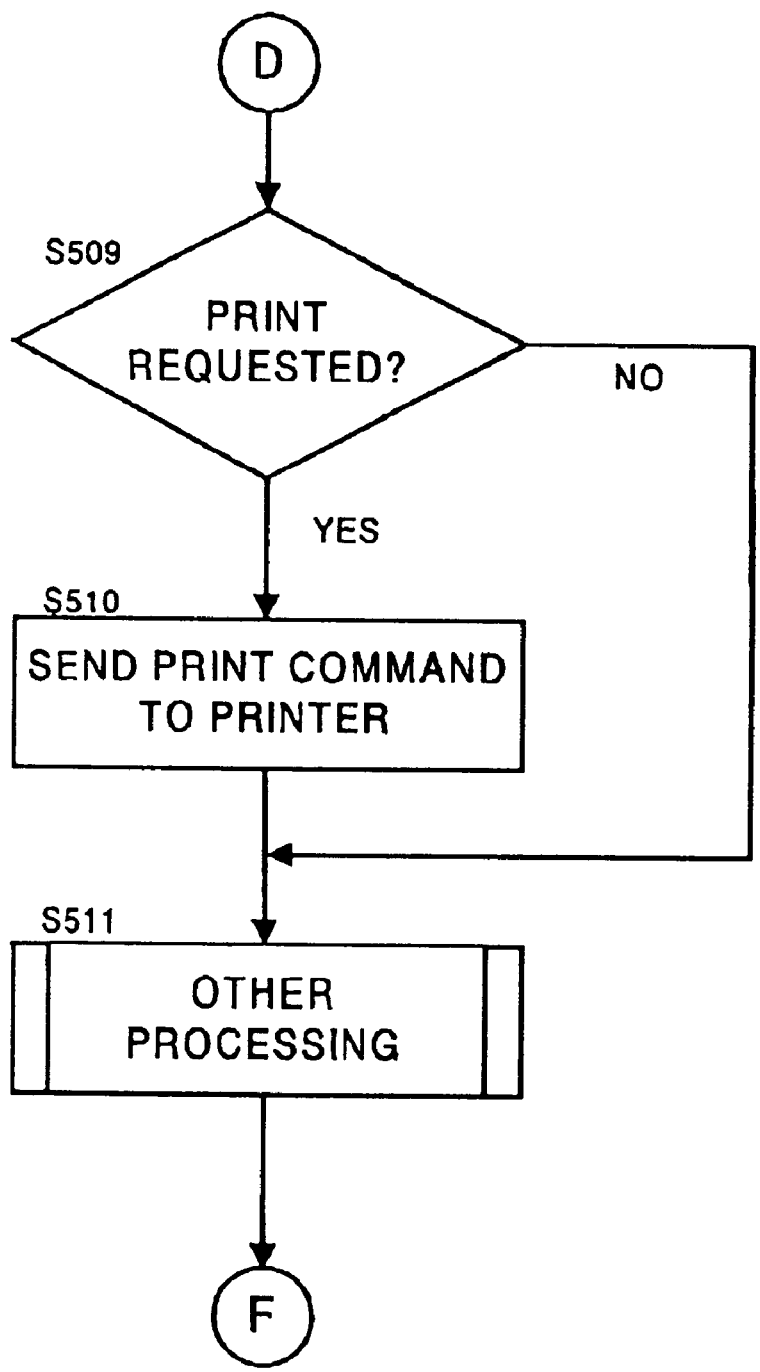

FIGS. 5SA to 5C are flowcharts showing a procedure of client processing to be executed by the client computer 120. The server computer 10 transmits index information generated in the HTML format and allows the existing browser, for example, Netscape Navigator, Internet Explore to execute client processing in order to transmit facsimile image information stored in the GIF format, for example, and index image information.

The client computer 120 determines whether or not facsimile index information is requested by the user (step S501).

It facsimile index information is requested (Yes in step S501), the client computer 120 requests the index information of the server computer 110 through the computer communication network 150 when selecting "open" from the menu of the browser and inputting http (Hyper Text Transfer Protocol) address provided by the server (step S502).

Next, the client computer 120 receives the requested index information from the server computer 110 through the computer communication network 150 (step S503), and interprets the HTML-format tags of index information, and displays index on the monitor display 308 (step S504).

Figure 6:
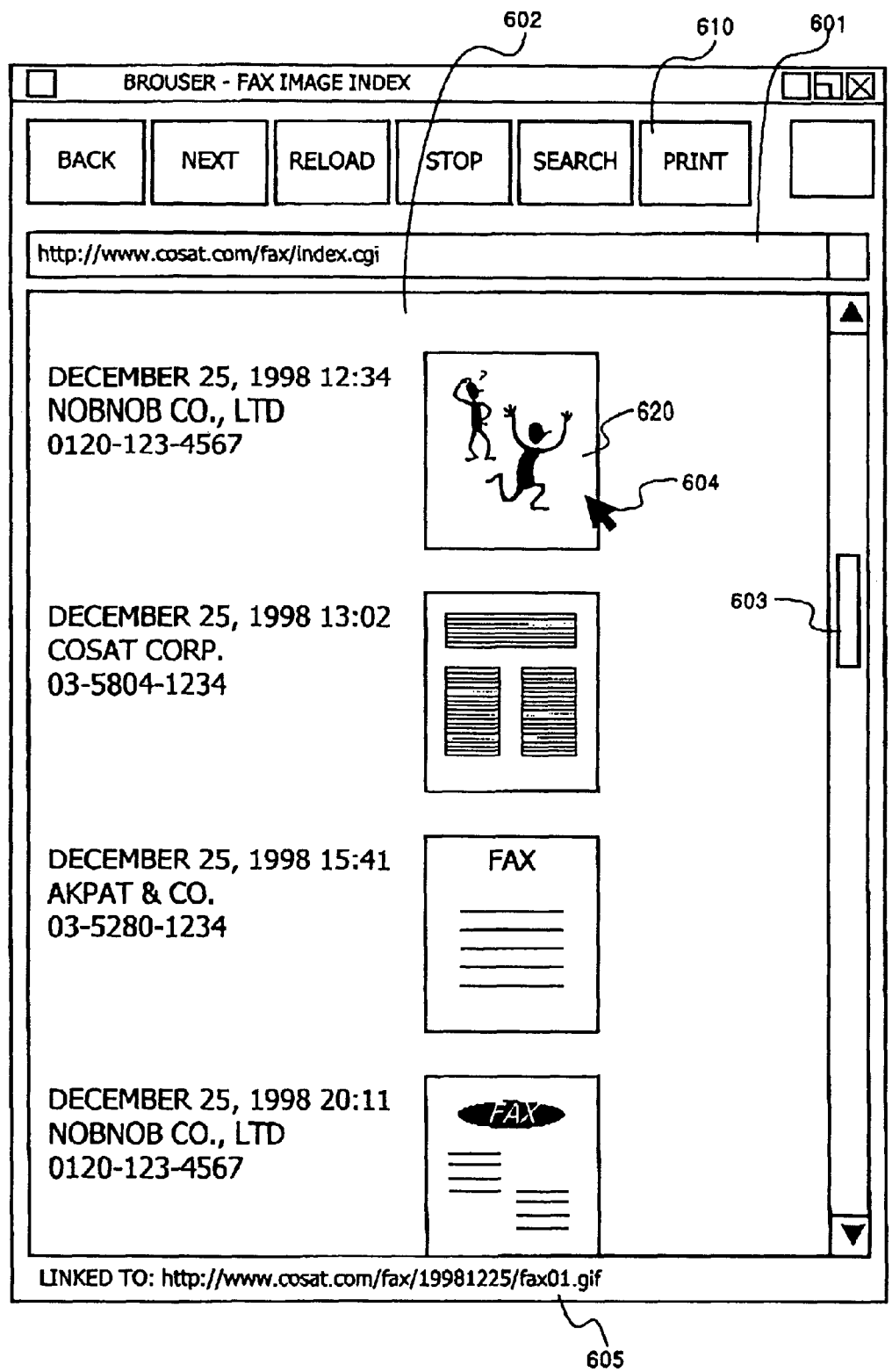
FIG. 6 is an example of an image display, which is obtained when index information is displayed on a monitor display of the client computer.

FIG. 6 shows a display example of images displayed on the monitor display 308 in step S504. As shown in FIG. 6, information such as sender's telephone numbers, and a plurality of sets of thumbnail images are displayed.

A CGI script for requesting index information is displayed in an http address display area 601. Also, the direct input of the http address makes it possible to request index information of the server computer 110.

A facsimile arrival time, sender's name of facsimile, the title name, sender's telephone (facsimile) number, an a plurality of sets of thumbnail images of facsimile are displayed in an information display area 602.

If the number of facsimile image information, which cannot be displayed on one screen, is stored, a scroll 60(3 placed at the right portion of the information display area 602 is operated by the mouse 310, allowing information to be moved to a desired position.

A location, at which facsimile image information corresponding to a thumbnail image 620 being currently pointed out by a cursor 604 is stored in the hard disk 203 of the server computer 110, is displayed in a message display area 605 placed at the lower portion of the display screen. Specifically, information of http://www.cosat.com/fax/19981225/fax01.gif corresponds to the location where facsimile image information is stored in the hard disk 203.

Moreover, the client computer 120 checks whether or not the user has selected necessary facsimile image information displayed on the screen (step S505).

In the display example shown in FIG. 6, the user adjusts the cursor 604 to the thumbnail image display, and clicks the mouse 310, thereby facsimile image information corresponding to the thumbnail image can be selected as "necessary facsimile image information."

If the user has selected necessary facsimile image information (Yes in step S505), the client computer 120 requests the corresponding facsimile image information of the server computer 110 through the computer communication network 150 (step S506). Then, the client computer 120 receives the corresponding facsimile image information from the server computer 10 through the computer communication network 150, and displays the corresponding facsimile image information on the monitor display 308 (step S508).

Figure 7:
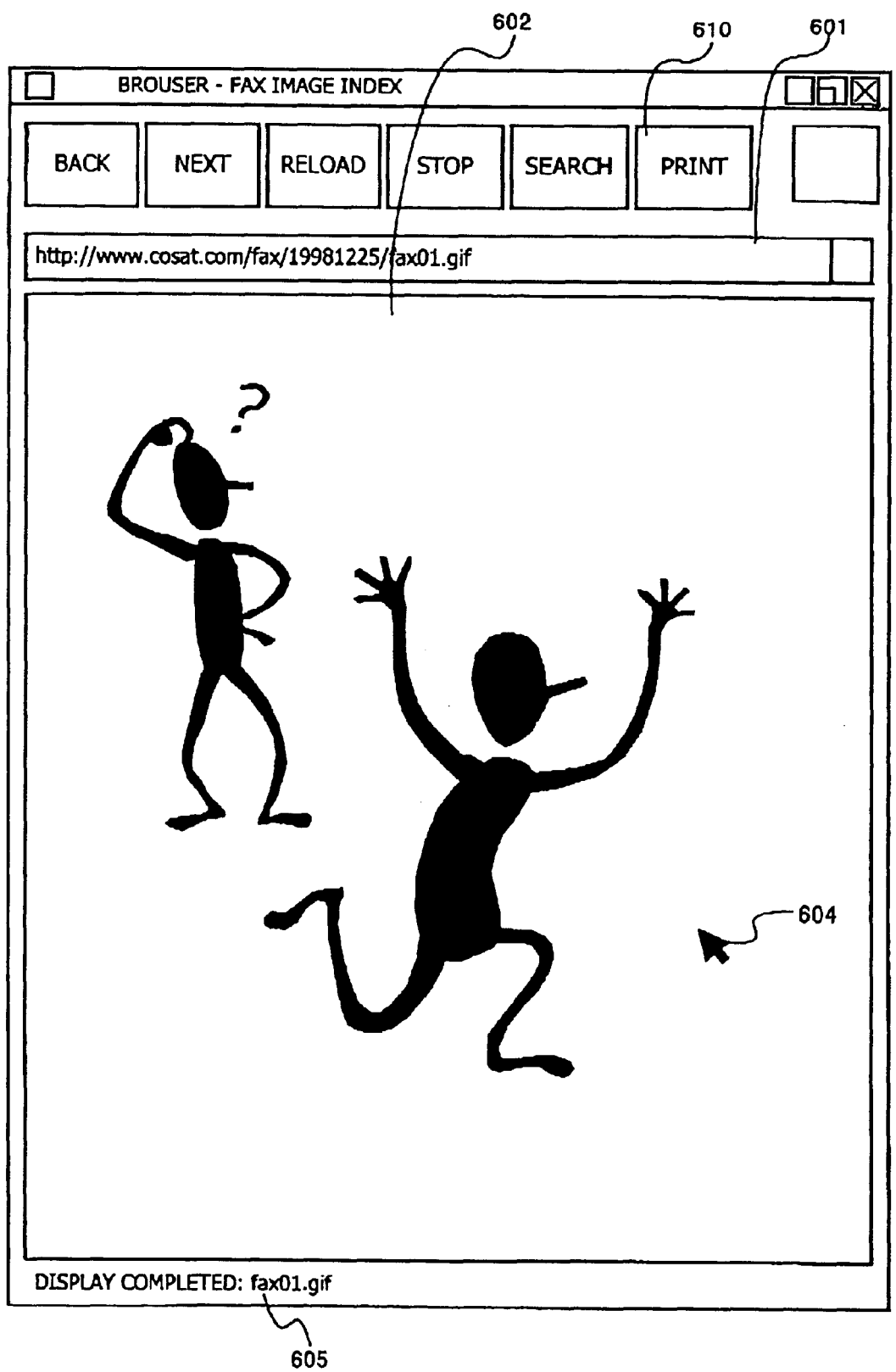
FIG. 7 is an example of an image display, which is obtained when facsimile image information is displayed on a monitor display of the client computer.

FIG. 7 shows a display example of the image displayed on the monitor display 308 in step S507. In a case where the sender's telephone number and the sets of the thumbnail images 620, which are first displayed in the display example of FIG. 6, are selected, for example, the thumbnail image 620 is clicked, facsimile image information, which is the generation source of the thumbnail images 620, is displayed the information display area 602.

The http address display area 601 displays information representing the location where the facsimile image information is stored in the server computer 110.

The client computer 120 checks whether or not the user has requested that information being currently displayed should be printed by the printer (step S509) in the following cases.

More specifically, they are the case in which facsimile index information is not requested (No in step S501), the case in which necessary facsimile image information has not been; selected (No in step S505) after displaying the sender's telephone number and the plural sets of the thumbnail images in step S504, and the case in which necessary image is displayed in step S507.

Then, if the user has requested the printing (Yes in S509), the client computer 120 sends a command for printing the image information being currently displayed to the printer (step 510).

By requesting the printing when the display is shown as shown in FIG. 6, the list of facsimile image information, which is currently stored in the server, can be printed. By requesting the printing when the display is made as shown in FIG. 7, only necessary facsimile image information can be printed.

For example, the selection of "print" from the menu of the browser and the clicking a print button 610 to adjust to the cursor 604 allow the content of the screen, which is currently displayed, to be printed.

If no print request is sent (No in step S509) or after step S510 is ended, the other processing is performed (step S511) and the operation goes back to step S501.

As the other processing, processing in which the display of received index information is executed by the client computer 120 can be adopted.

In the display example shown in FIG. 6, the respective thumbnail images are arranged in order of the arrival time. However, for example, they can be processed to be arranged in order of the telephone number and that of the sender's name and title name.

These operations are controlled by the CPU 311, and this control program is installed on the bard disk 303 through the FD drive 306, CD-ROM drive 307, or the computer communication network 150 from FD or DC-ROM.

Particularly, for implementing this client processing by the browser, it is possible to adopt, an embodiment in which an applet program, which is provided by the server computer 110, is used as a control program and this control program can be downloaded to the RAM 304 or the hard disk 303 through the computer communication network 150 so as to be executed by the CPU 311.

Thus, there can be provided a facsimile image information managing system wherein a client computer can select desired facsimile image information from those received by a server computer, display it, and print it.

According to the present invention, index information including index image information and facsimile image information as such are separately transmitted, thereby allowing the user to select only necessary facsimile image information and print it, and allowing traffics in the communication network 150 to be reduced.

Second Embodiment

The second embodiment is one in which sorted index information is displayed in accordance with the instruction from the client computer in the procedure shown as the other processing (step S511) of the first embodiment.

Figure 8:
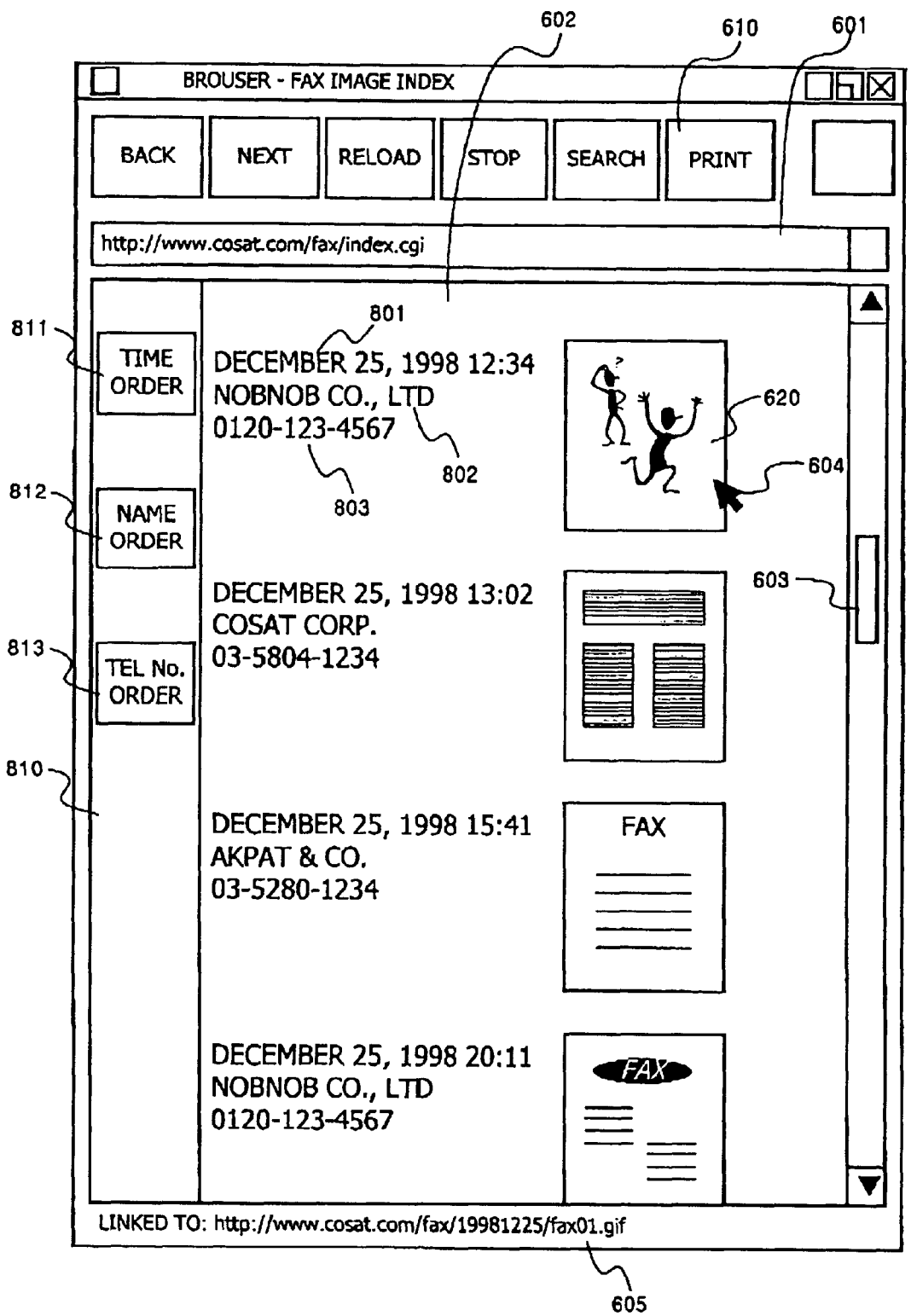
FIG. 8 is an example of an image display, which is obtained when index information is displayed on the monitor display of the client computer according to a second embodiment of the present invention.

FIG. 8 is a screen display example in which index information is displayed on the monitor display of the client computer of the facsimile image information managing system including the facsimile image information managing client of the present invention. The same reference numerals as those of FIGS. 6 and 7 of the first embodiment are added to the elements common to FIGS. 6 and 7 of the first embodiment.

In the display example of FIG. 8, a thumbnail image 620 of the facsimile image received similar to the first embodiment, time 801 when the thumbnail image has been received, a sender's name 802, and a sender's telephone number 803 are displayed on the screen. In addition, another frame 810 is displayed at the left of the display screen by use of a frame function of the browser, and a time order sort button 81, a name order sort button 812 and a telephone number order sort button 813 are displayed thereon.

The user selects a desired button from the time order sort button 811, name order sort button 812 and telephone number order sort button 813, moves the cursor 604, and clicks the button by the mouse. Then, the client computer 120 sorts index information and displays it in selected order.

Since the sorted index information is displayed on the in formation display area 602 in accordance with the index information, the order of the thumbnail images 620 of the facsimile image is changed and displayed thereon.

Figure 9:
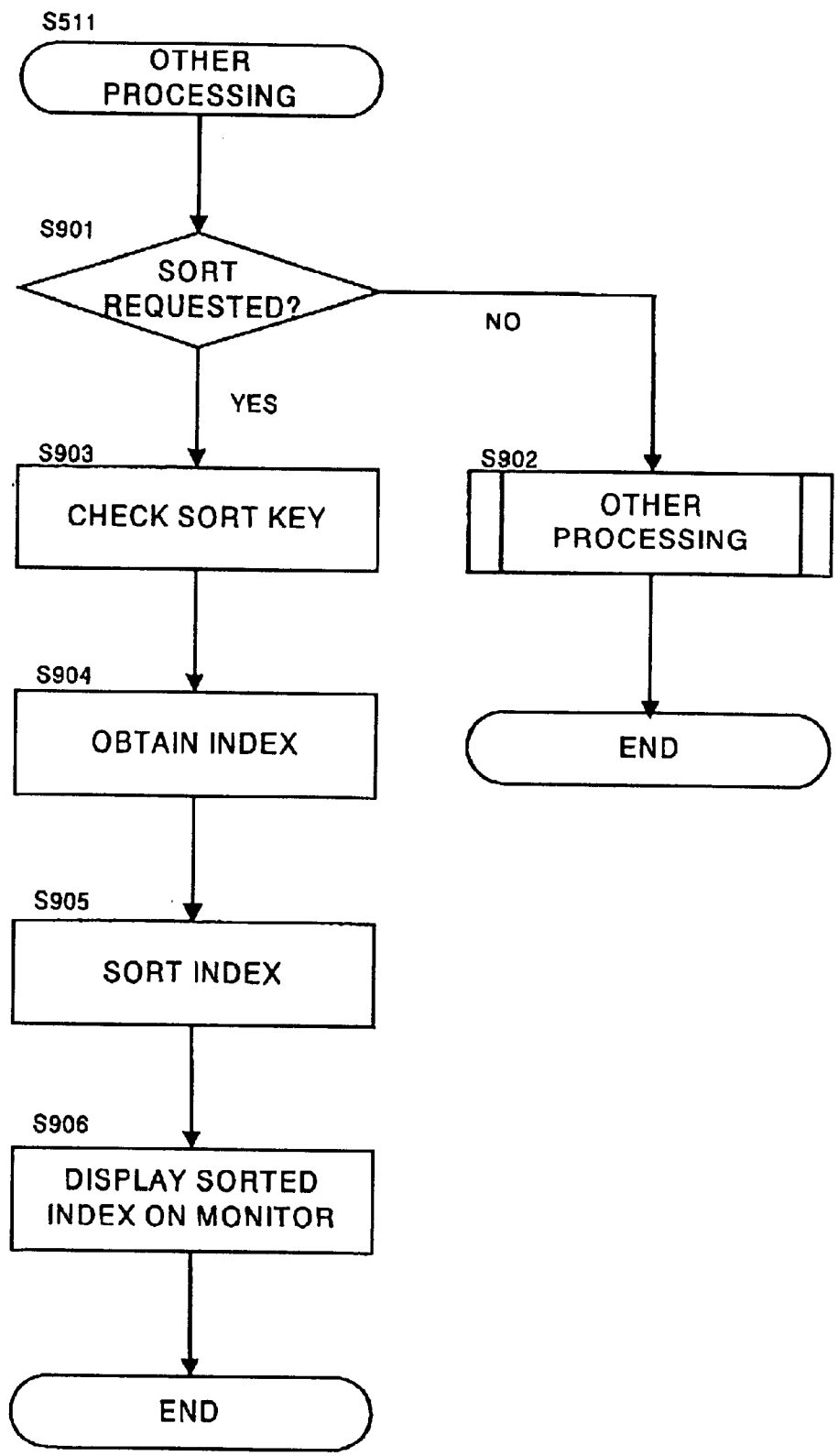
FIG. 9 is a flowchart showing a procedure of sort processing to be executed by a facsimile image information management client apparatus (client computer) according to the second embodiment of the present invention.

FIG. 9 is a flowchart showing a procedure of the other processing (step S511) in the case of processing sort input, which is performed by the client computer 120, in the other processing (step S511) of the first embodiment.

First, the CPU 311 checks whether or not an instruction for sorting index information has been input (step S901). The instruction for performing the sort is input when the user clicks any one of the time order sort button 811, name order sort button 812 and telephone number order sort button 813.

If the instruction for performing the sort is not input (No in step S901), processing other than the sort is executed (step S902), and this processing is ended.

If the instruction for sorting is input (Yes in step S901), the CPU 311 checks a key for sort (step S903). The key for sort is determined by clicking any one of the time order sort button 811, name order sort button 812 and telephone number order sort button 813.

Moreover, CPU 311 obtains displayed index information (step S904). Index information transmitted to the client computer 120 from the server computer 110 is stored in RAM 304 of the client computer 120 and the hard disk 303. Herein, this information is obtained.

An example of index information written in HTML for sorting is shown in FIG. 10. The entirety of index information is enclosed with HTML tags <table> and </table>.

Index information, which corresponds to one facsimile image information, is enclosed with HTML tags <tr> and <tr>. The sender's telephone number, name, reception time, and reference with respect to the thumbnail image are enclosed with HTML tags <td> and </td>, respectively. Thus, since information is divided, sort or index information can he performed even if any one of these is used as a key.

Then, the CPU 311 sorts obtained index information in accordance with the specified key (step S905), and finally displays sorted index information on the monitor display 308 (step S906), and this processing is ended.

In the second embodiment, the client sorted the index information. However, the server may sort the index information. In this case, the user selects desired one of the sort buttons, tube client sends sort key to the server in response to the selection. The client sort the index information in accordance with the sort key and sends the sorted index information to the client. Then the client displays the sorted index information.

Third Embodiment

The third embodiment is one in which necessary information is scanned by the scanner in accordance with the user's instruction and transmitted to the transmission destination through the telephone line in the procedure shown in the other processing (step S511) of the first embodiment.

An image on a paper is scanned by the scanner 140 to generate a facsimile image information, and the generated facsimile image information is stored in the hard disk 203 of the server computer 110. Then, the telephone (facsimile) number of the transmission destination is input from the keyboard 209 of the server computer 110 or the key board 309 of the client computer 120, so that the corresponding facsimile image information is transmitted to the transmission destination through the modem 201.

The use of such an embodiment can, provide a facsimile information managing server apparatus of the facsimile managing system, which can not only receive facsimile image information but also transmit it and which is replaceable with the conventional facsimile apparatus.

As explained above, according to the present invention, there can be provided a facsimile image information managing client apparatus of the facsimile image information managing system wherein a client computer can select desired facsimile image information from those received by a server computer, display it, and print it.

Particularly, there can be provided the facsimile image information managing client apparatus of the facsimile information managing system with a high function, which is replaceable with the conventional facsimile apparatus and which is connectable to the network.

An information recording medium, for example, a Floppy disk, CD-ROM, which records the program for controlling the facsimile image information managing client apparatus, can be easily distributed and sold as a software product independently of the information processing apparatus such as a computer. In addition, the program may he embodied in a carrierwave and may be transmitted through a network such as the Internet.

Various embodiments and changes may be made thereunto without departing from the broad spirit and scope of the invention. The above-described embodiment are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Applications Nos. H10-369682 filed on Dec. 25, 1998, H11-008159 filed on Jan. 14, 1999, and H11-015203 filed on Jan. 25, 1999, and including specification, claims, drawings and summary. The disclosures of the above Japanese Patent Applications are incorporated herein by reference in its entirety.

What is claimed is:

1. A facsimile image information managing system comprising:
   (a) a server which receives a plurality of facsimile image information,
   stores said plurality of received facsimile image information,
   generates index information which refers to each storage location of said plurality of stored facsimile image information and generates thumbnail image information for each plurality of stored facsimile image information, transmits said generated index information and said generated thumbnail image information associated therewith accepts a request for specifying the storage location of facsimile image information, and transmits the facsimile image information stored at the storage location specified in accordance with said accepted request;

(b) a relay which relays the index information and the thumbnail image information associated therewith transmitted by said server, the request for specifying the storage location of the facsimile image accepted by said server, and the facsimile image information; and (c) a client which receives the plurality of index information and the plurality of thumbnail image information associated therewith which has been transmitted by said server and relayed by said relay, displays said received index information and said plurality of received thumbnail image information associated therewith in one display area, accepts an input for selecting one of said plurality of displayed thumbnail image information to select the storage location of the facsimile image information from said displayed index information associated with the selected thumbnail image information, causes said relay to relay the request for specifying the storage location of the facsimile image information selected by said accepted input so as to be transmitted to said server, receives the facsimile image information which has been transmitted by said server and relayed by said relay, and displays said received facsimile image information.

2. The facsimile image information managing system according to claim 1, wherein said client further comprises a printer, and wherein when said client accepts an input for selecting facsimile image information to be printed from said displayed facsimile image information, and transmits the facsimile image information selected by said accepted input, said printer receives the facsimile image information transmitted by said client and prints said received facsimile image information.

3. The facsimile image information managing system according to claim 1, further comprising a printer, wherein said client and said printer are connected through said relay, when said client accepts an input for selecting facsimile image information to be printed from said displayed facsimile image information, transmits the facsimile image information selected by said accepted input to said printer through said relay, and said printer receives the facsimile image information transmitted by said client and prints said received facsimile image information.

4. The facsimile image information managing system according to claim 1, wherein said index information includes sender information of a sender that sends facsimile image information, and said client displays said sender information and accepts the input for selecting the storage location of the facsimile image information.

5. The facsimile image information managing system according to claim 1, further comprising, a scanner, wherein said client accepts an input for selecting a transmission destination to which facsimile image information scanned by said scanner is transmitted, and transmits the facsimile image information to said server after said transmission destination is relayed by said relay, said server receives the transmission destination relayed by said relay, and transmits the facsimile image information scanned by said scanner to said transmission destination.

6. A facsimile image information managing server apparatus comprising:

(a) an image information receiver which receives a plurality of facsimile image information;

(b) a nonvolatile storage which stores the plurality of facsimile image information received by said image information receiver;

(c) an index information generator which generates index information which refers to each storage location of said plurality of facsimile image information stored by said nonvolatile storage and each thumbnail image information of said plurality of facsimile image information stored by said nonvolatile storage;

(d) a request receiver which receives a request from a client apparatus connected through a computer communication network;

(e) a response transmitter which transmits a response to the client apparatus connected through the computer communication network;

(f) an index information transmission controller which controls said response transmitter to transmit a response, which includes the index information and the plurality of thumbnail image information therewith generated by said index information generator, to said client apparatus when said request receiver receives a request for obtaining index information from the client apparatus connected through the computer communication network in order for the client apparatus to display said index information and said plurality of thumbnail image information in one display area, accepts an input for selecting one of said plurality of displayed thumbnail image information to select the storage location of the facsimile image information from said displayed index information associated with the selected thumbnail image information and send a request for the selected storage location of the facsimile image information to the server apparatus; and (g) a facsimile image information transmission controller which controls said response transmitter to transmit a response, which includes facsimile image information stored at a location specified by said nonvolatile storage, to said client apparatus when said request receiver receives a request for obtaining said facsimile information from the client apparatus connected through the computer communication network after specifying the location where said facsimile image information is stored.

7. The facsimile image information managing server apparatus according to claim 6, further comprising:

(h) an index information sorter which sorts index information which refers to the storage location of the facsimile image information, and generates index information when said request receiver receives a request for sorting index information from the client apparatus connected through the computer communication network; and (i) a sorted index information transmission controller which controls said response transmitter to transmit index information sorted and generated by said index information sorter.

8. The facsimile image information managing server apparatus according to claim 1, wherein said nonvolatile storage stores a sender's telephone number of the facsimile image information received by said image information receiver, time when said facsimile image information is received by said image information receiver, and sender information corresponding to said telephone number, and said index information sorter uses any one of sender's telephone number of facsimile image information stored in said nonvolatile storage, time when facsimile image information is received, sender information of facsimile image information or the combination thereof as a key, and sorts index information to be generated.

9. An information recording medium storing a program for controlling a server for managing facsimile image information to perform:
(a) an image information receiving step of receiving a plurality of facsimile image information;
(b) a nonvolatile storing step of storing the plurality of facsimile image information, which has been received by said image information receiving step, in a nonvolatile manner;
(c) an index information generating step of generating index information, which refers to each storage location of the facsimile image information stored by said nonvolatile storing step and each thumbnail image information of said facsimile image information stored by said nonvolatile storing step, when a request for obtaining index information from a client apparatus connected through a computer communication network is received;
(d) an index information transmitting step of transmitting a response, which includes the index information and the plurality of thumbnail image information therewith generated by said index information generating step, to said client apparatus, in order for the client apparatus to display said index information and said plurality of thumbnail image information in one display area, accepts an input for selecting one of said plurality of displayed thumbnail image information to select the storage location of the facsimile image information from said displayed index information associated with the selected thumbnail image information and send a request for the selected storage location of the facsimile image information to the server apparatus; and
(e) a facsimile image information transmitting step of transmitting a response, which includes facsimile image information stored at a location specified by said nonvolatile storing step, to said client apparatus when a request for obtaining said facsimile information from the client apparatus connected through the computer communication network is received by said request receiving step after specifying the location where said facsimile image information is stored.

10. A computer data signal embodied in a carrierwave, the computer data signal controlling a server for managing facsimile image information to perform:
(a) an image information receiving step of receiving a plurality of facsimile image information;
(b) a nonvolatile storing step of storing the plurality of facsimile image information, which has been received by said image information receiving step, in a nonvolatile manner;
(c) an index information generating step of generating index information, which refers to each storage location of the plurality of facsimile image information stored by said nonvolatile storing step and each thumbnail image information of said facsimile image information stored by said nonvolatile storing step, when a request for obtaining index information from a client apparatus connected through a computer communication network is received;
(d) an index information transmitting step of transmitting a response, which includes the index information and the plurality of thumbnail image information therewith generated by said index information generating step, to said client apparatus, in order for the client apparatus to display said index information and said plurality of thumbnail image information in one display area, accepts an input for selecting one of said plurality of displayed thumbnail image information to select the storage location of the facsimile image information from said displayed index information associated with the selected thumbnail image information and send a request for the selected storage location of the facsimile image information to the server apparatus; and
(e) a facsimile information transmitting step of transmitting a response, which includes facsimile image information stored at a location specified by said nonvolatile storing step, to said client apparatus when a request for obtaining said facsimile information from the client apparatus connected through the computer communication network is received by said request receiving step after specifying the location where said facsimile image information is stored.

11. A method for managing facsimile image information comprising:
(a) an image information receiving step of receiving a plurality of facsimile image information;
(b) a nonvolatile storing step of storing the plurality of facsimile image information , which has been received by said image information receiving step, in a nonvolatile manner;
(c) an index information generating step of generating index information, which refers to each storage lo cation of the plurality of facsimile image information stored by said nonvolatile storing step and each thumbnail image information of said plurality of facsimile image information stored by said nonvolatile storing step, when a request for obtaining index information from a client apparatus connected through a computer communication network is received;
(d) an index information transmitting step of transmitting a response, which includes the index information and the plurality of thumbnail image information therewith generated by said index information generating step, to said client apparatus, in order for the client apparatus to display said index information and said plurality of thumbnail image information in one display area, accepts an input for selecting one of said plurality of displayed thumbnail image information to select the storage location of the facsimile image information from said displayed index information associated with the selected thumbnail image information and send a request for the selected storage location of the facsimile image information to the server apparatus; and
(e) a facsimile image information transmitting step of transmitting a response, which includes facsimile, image information stored at a location specified by said nonvolatile storing step, to said client apparatus when a request for obtaining said facsimile information from the client apparatus connected through the computer communication network is received by said request receiving step after specifying the location where said facsimile image information is stored.

* * * * *

UNITED STATES PATENT AND TRADEMARK OFFICE
CERTIFICATE OF CORRECTION

PATENT NO. : 6,704,775 B1
DATED : March 9, 2004
INVENTOR(S) : Kazutaka Sato

It is certified that error appears in the above-identified patent and that said Letters Patent is hereby corrected as shown below:

Column 15,
Line 62, change "further comprising, a scanner," to -- further comprising a scanner, --.

Column 18,
Line 17, change "a facsimile information" to -- a facsimile image information --.
Line 58, change "which includes facsimile," to -- which includes facsimile --.

Signed and Sealed this

Twenty-fifth Day of May, 2004

JON W. DUDAS
*Acting Director of the United States Patent and Trademark Office*